July 25, 1933.　　E. A. BROWN, JR., ET AL　　1,919,412
FURNACE
Filed Sept. 7, 1932
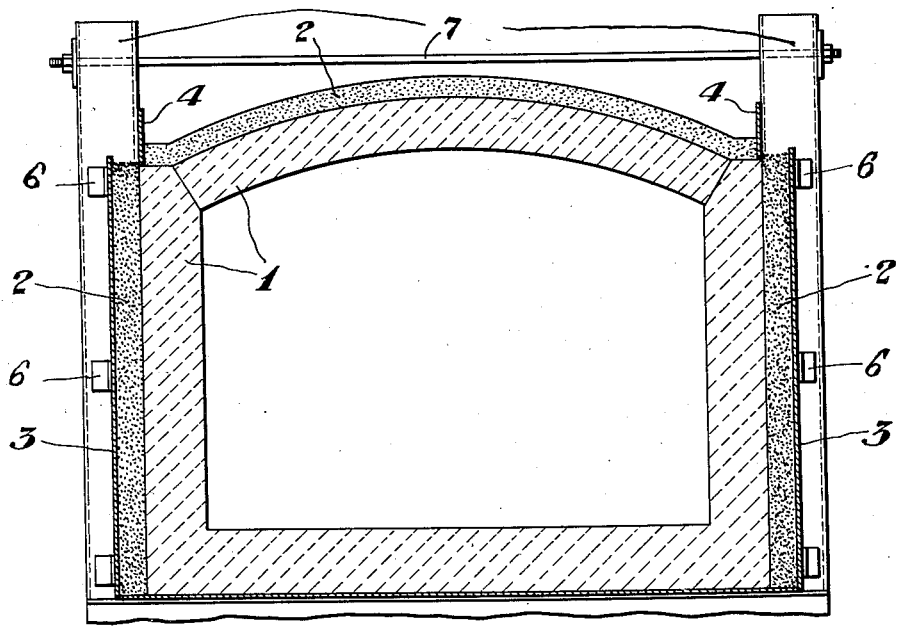
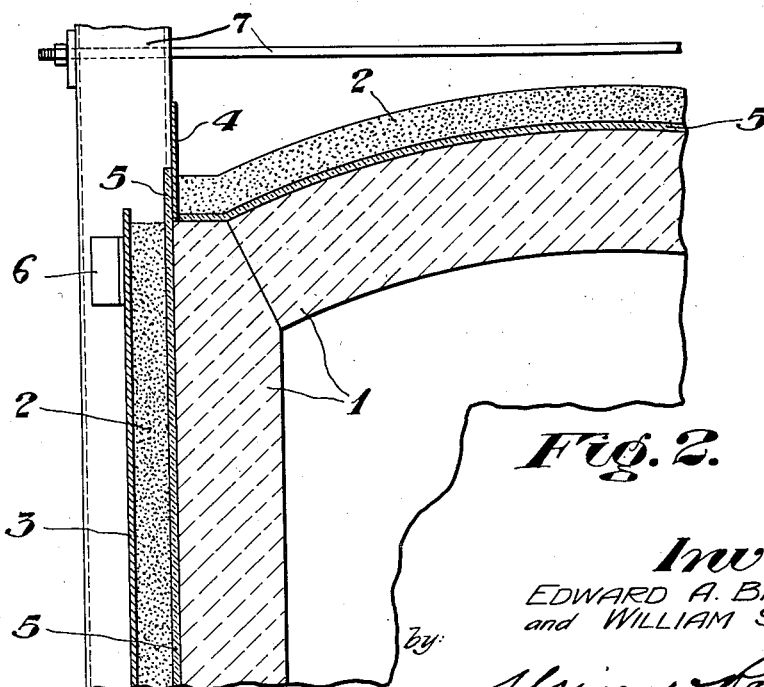
Inventors:
EDWARD A. BROWN, JR.
and WILLIAM S. UNGER.
by
their Attorneys.

Patented July 25, 1933

1,919,412

UNITED STATES PATENT OFFICE

EDWARD A. BROWN, JR., OF PITTSBURGH, AND WILLIAM S. UNGER, OF MUNHALL, PENNSYLVANIA

FURNACE

Application filed September 7, 1932. Serial No. 632,060.

This invention relates to furnaces, one object being to provide an insulated and long lived structure. Other objects may be inferred from the following.

Referring to the drawing:

Figure 1 is a vertical cross-section of a furnace.

Figure 2 is a modification of Figure 1.

A furnace 1 is generally indicated. It may be an open hearth, pottery kiln or other structure in which relatively high temperatures are attained. It is insulated against heat losses. This is ordinarily rather expensive because its top and other destructible parts must be frequently renewed, which necessitates the equally frequent discard or reconditioning of the insulation.

In the present instance, granulated blast furnace or cupola slag is applied in a layer 2 which is retained on the furnace's sides by walls 3 and on its top by ledges 4. This slag is loosely applied so that it retains its naturally fluent character. These walls may be of iron plates which are positioned by crossbars 6 secured to the furnace's frame 7, the latter being constructed in the usual manner.

The low cost and convenience of this construction is immediately apparent. When repairs are necessary the slag may be thrown away without regret and a new batch substituted. This blast furnace slag is also extremely light, has a low coefficient of heat conductivity and a high melting point. Its expansion coefficient is inconsequential because its fluent character permits it to run into contraction spaces the moment they form. This last is an important feature and is present in other refractories having a granulated or otherwise fluent form.

Now it may sometimes happen that there is danger of the slag and furnace structure chemically reacting. This may also happen with other types of insulation regardless of the character or mode of application, especially if one be basic and the other acidic.

In the furnace, illustrated by Figure 2, trouble from the above is prevented by interposing a thin layer of overlapped asbestos 5 between the two substances. Other chemically inert or neutral substances arranged between the chemically active parts will protect the furnace. For instance, a slurry form of chrome ore (a neutral material) may be used instead of the asbestos.

Although specific forms of the invention have been shown and described in accordance with the patent statutes, it is not intended to limit the scope thereto, except as defined by the following claims.

We claim:

1. The combination of a furnace, a fluent refractory, and means for retaining said refractory on the exterior surface of said furnace.

2. The combination of a furnace, a refractory on said furnace's surface, and a chemically inert or neutral substance between said refractory and surface.

3. The combination of a furnace, subdivided solid blast furnace or cupola slag on the outer surface of said furnace, and means for retaining said slag on said furnace's surface.

4. The combination of a furnace, walls spaced from said furnace's sides, a ledge around said furnace's top, and a subdivided solid refractory between said walls and furnace's sides and on said furnace's top.

5. The combination of a furnace, walls spaced from said furnace's sides, a ledge around said furnace's top, a subdivided solid refractory between said walls and furnace's sides and on said furnace's top, and a chemically inert or neutral substance between said refractory and furnace's surface.

6. The combination of a furnace, walls spaced from said furnace's sides, a ledge around said furnace's top, subdivided solid blast furnace or cupola slag between said walls and furnace's sides and on said furnace's top, and overlapped asbestos sheets between said slag and said furnace's top and sides.

EDWARD A. BROWN, JR.
WILLIAM S. UNGER.